Nov. 8, 1927.
H. P. HANSON
HEAT DISTRIBUTOR FOR AUTOMOBILES
Filed June 10, 1926
1,648,269
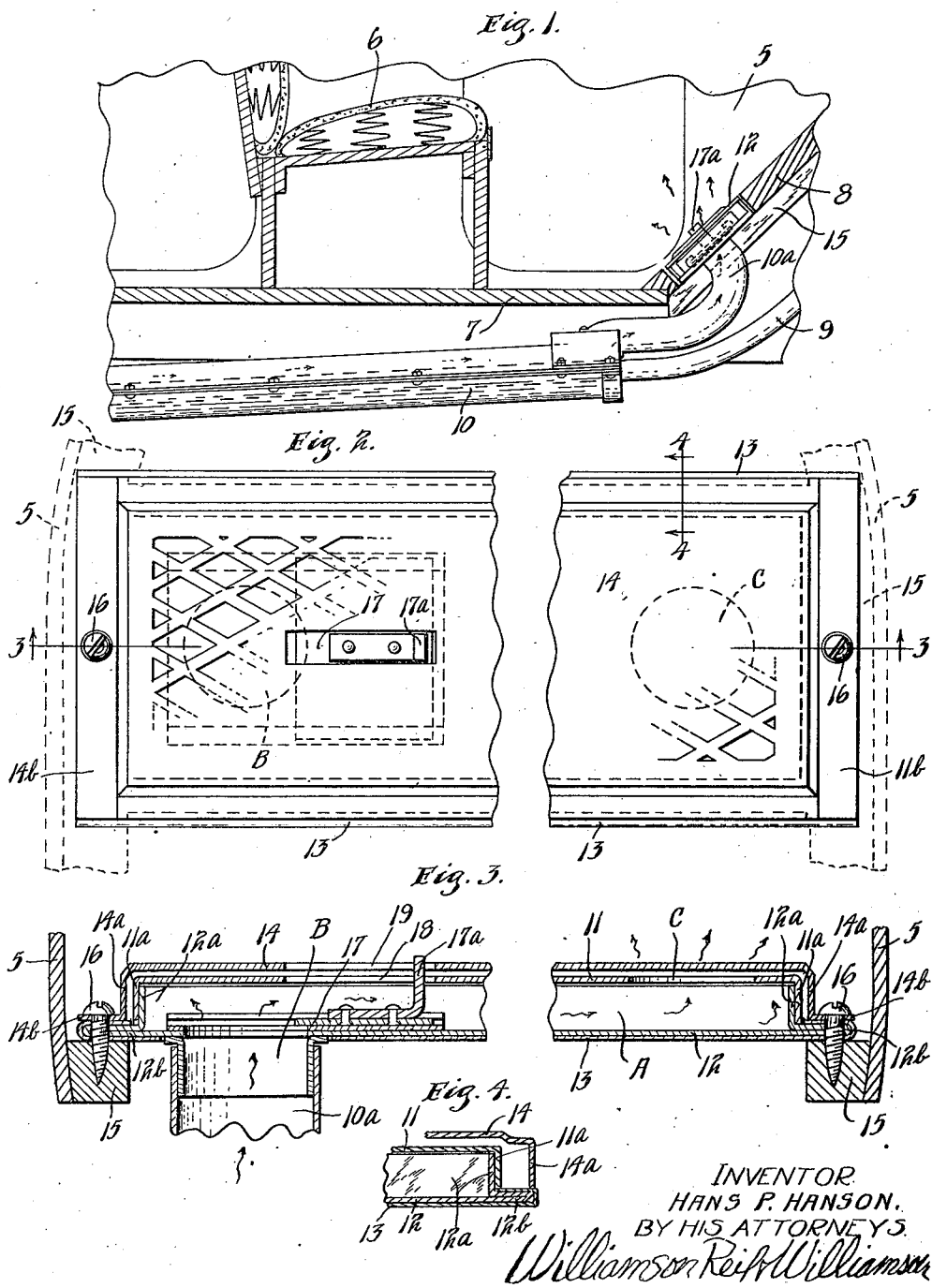

Patented Nov. 8, 1927.

1,648,269

UNITED STATES PATENT OFFICE.

HANS P. HANSON, OF CAMBRIDGE, MINNESOTA.

HEAT DISTRIBUTOR FOR AUTOMOBILES.

Application filed June 10, 1926. Serial No. 115,010.

This invention relates to heat distributors especially adapted to be utilized in connection with an automobile heater.

The main object of the invention is to provide an extremely simple, inexpensive but highly efficient heat distributor having a relatively large foot warming area adapted to be connected at one end to a heating device of any type and delivering the heated air at the opposite end adjacent the seat of the driver.

Another object of the invention is to provide a heat distributor for motor cars adapted to replace one of the floor boards of the car body, provision being made for quickly attaching the device in operative position.

It is a more specific object to provide such a device comprising a relatively thin heating chamber adapted to be disposed transversely of the body of a motor car having superimposed thereabout a protective grid upon which the occupants of the car may support their feet and having an outlet adjacent one end adapted to deliver a blast of hot air adjacent the seat of the driver.

These and other objects of the invention will be apparent from the following description made in connection with the accompanying drawings, wherein like characters refer to similar parts throughout the several views, and in which Fig. 1 is a vertical section taken through the forward end of an automobile body, showing my device applied to the floor boards below the pedals;

Fig. 2 is a plan view of a preferred embodiment of the device,

Fig. 3 is a section taken on the line 3—3 of Fig. 2, and

Fig. 4 is a fragmentary cross section taken on the line 4—4 of Fig. 2.

In Fig. 1 a preferred embodiment of the invention is shown mounted in the inclined foot board of a motor vehicle and connected to a type of automobile heater, such as that disclosed in my pending U. S. application, entitled "Heating device for automobiles", S. N. 4293, filed January 23, 1925. The body of the motor car is indicated by the numeral 5, having therein the usual driver's seat 6, floor board 7, and the inclined floor board or foot board 8.

About the exhaust pipe 9, an automobile heater 10 is provided delivering at its forward end through outlet pipe 10ª to my heat distributor. It is of course understood that my device may be used with any type of automobile heater whether mounted on the exhaust pipe or manifold of the engine.

In the preferred embodiment of the invention illustrated, an elongated rectangular casing designated as an entirety by the letter A is provided, forming a thin heating chamber of considerable length and width. Casing A may be formed in any desired manner and is here shown as comprising upper and lower rectangular shell members 11 and 12 respectively, lower member 12 having its side and end edges bent inwardly upon the body thereof and upwardly to form the upstanding rectangular lip 12ª and the doubled flange 12ᵇ. Upper shell member 11 has a rectangular depending lip 11ª telescoped with lip 12ª co-operating therewith to form chamber A.

The bottom 12 and flanges 12ᵇ are preferably covered with a layer 13 of some non-conductive material, such as asbestos to prevent the radiation of heat from the lower portion of the casing. A foot supporting grid or register 14 having a reticulated body is superimposed about the top of casing A, spaced a slight distance thereabove. Register 14 has its sides downturned to form the flanges 14ª, the edges of which contact the flange 12ᵇ of the lower shell of the casing, thereby spacing the register and casing the proper distance apart.

Adjacent one end of casing A, an air intake B is formed through the lower shell member 12 in position to be connected to the delivery end of the heater 10. A discharge opening C is formed adjacent the opposite end of casing A through the top shell 11, adapted to deliver a blast of hot air adjacent the feet of the driver.

A valve 17 preferably of the sliding type is provided in casing A, suitable guide means being provided in lower shell member 12 about the intake passage B. Vertically alined slots 18 and 19 of substantial size are formed in the upper shell 11 of the casing and the register 14, respectively to permit the operating handle and finger piece 17ª of the valve to project through the distributor for a convenient manipulation, and to, moreover, deliver a blast of air adjacent one end of the casing. Preferably the area of slots 18 and 19 is equal to approximately two thirds of the area of the discharge opening C.

The device is substituted for one of the foot boards of the automobile body, preferably the foot board below the driving pedals and is attached to the supporting strips 15 in the same manner as the floor boards. The register 14 has its end portions downturned and outturned to form the horizontal flanges 14$^b$ adapted to lie flush against the end portions of the flanges 12$^b$ of the lower shell section. Screws 16 may be employed to secure the ends of the device to the supporting strips 15 (see Fig. 3).

It will be seen that the heated air will be delivered to casing 8 at the end adjacent the exhaust and will slowly pass through the casing, heating the upper shell 12 and causing the radiation and transmission of a considerable amount of heat through register 14. A relatively small blast of heated air will be delivered through the slots 18 and 19 adjacent the intake end of the casing A, while the remainder of the heated air passing through the distributor will be delivered upwardly through discharge passage C, disposed slightly below the foot pedals of the motor vehicle. The amount of air passing through the casing can, of course, be regulated by slide valve 17. The slots 18 and 19, therefore, perform two functions in accommodating the valve operating handle 17$^a$ and in causing a blast of heated air to be delivered adjacent the feet of the passenger in the front seat of the car.

The device will not project upwardly and thereby obstruct or impede the driver, but will lie substantially flush with the adjacent foot boards 8 and will be substituted for one thereof. The interior of the automobile will be heated by the considerable amount of radiation from the uninsulated upper shell 11, as well as by the delivery of substantial amounts of heated air from the two discharge passages.

From the foregoing description, it will be seen that I have invented a simple but highly efficient heat distributor capable of being readily attached to standard motor vehicles, and adapted to insure the comfort of the passenger in cold weather.

It will, of course, be understood that various changes may be made in the form, details, arrangement and proportion of parts without departing from the scope of the invention.

While the embodiment of the invention illustrated is adapted to be substituted for one of the foot boards on the body of an automobile, it is of course obvious that the device may be attached to one of the foot boards or otherwise supported on the automobile body and will function in the manner described.

What is claimed is:

1. A heat distributor for an automobile having in combination a radiating chamber comprising a relatively shallow shell member adapted to be disposed transversely across the body of a motor vehicle adjacent the floor boards thereof, and an upper relatively shallow shell member telescoped with said lower member, said lower shell member having an intake passage adjacent one end thereof adapted to be connected to an automobile heater, said upper shell member having a discharge passage through the top thereof and adjacent the opposite end of said chamber, a valve disposed adjacent said intake passage and means for securing said chamber to the supporting means for the floor boards of the vehicle.

2. The structure set forth in claim 1, said valve having an operating handle extending through the top of said casing.

3. A heat distributor for an automobile having in combination a box like casing adapted to be disposed transversely across an automobile adjacent the floor boards, an intake passage adjacent one end of said casing adapted to be connected to an automobile heater, discharge passages through the top of said casing, one adjacent each end thereof, and said casing having a substantial amount of radiating surface between said discharge passages.

4. A heat distributor for an automobile having in combination an elongated casing adapted to be disposed transversely of an automobile body adjacent the floor boards, an intake passage adjacent one end thereof adapted to be connected to an automobile heater, a valve for controlling the admission of hot air through said intake passage having an outwardly projecting handle, an aperture through the upper portion of said casing through which said valve handle projects and moreover adapted to permit a restricted discharge of air therethrough, a relatively large discharge passage through the upper portion of said casing adjacent the opposite end thereof, said casing having a substantial amount of radiating surface between said discharge passages, and a grid disposed over said casing in spaced relation thereto, said grid being provided with an aperture through which said projecting valve handle extends.

5. A heat distributor for an automobile having in combination a radiating chamber comprising upper and lower relatively shallow telescoped shell members, an intake passage through said lower shell member adjacent one end of said chamber, adapted to be connected to an automobile heater, discharge passages through said upper shell member, one adjacent each end thereof, and said casing having a substantial amount of radiating surface between said discharge passages.

In testimony whereof I affix my signature.

HANS P. HANSON.